(12) United States Patent
Nagumo (10) Patent No.: US 10,547,754 B2
(45) Date of Patent: Jan. 28, 2020

(54) INFORMATION PROCESSING APPARATUS (71) Applicant: FUJI XEROX CO., LTD., Tokyo (JP)

(72) Inventor: Jun Nagumo, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/596,548

(22) Filed: May 16, 2017

(65) Prior Publication Data

US 2018/0124258 A1 May 3, 2018

(30) Foreign Application Priority Data

Oct. 27, 2016 (JP) .................. 2016-210672

(51) Int. Cl.
*G06F 15/00* (2006.01)
*H04N 1/00* (2006.01)
(52) U.S. Cl.
CPC ..... *H04N 1/00074* (2013.01); *H04N 1/00411* (2013.01); *H04N 1/00424* (2013.01); *H04N 1/00506* (2013.01); *H04N 2201/0094* (2013.01)

(58) Field of Classification Search
CPC ........... H04N 1/00074; H04N 1/00411; H04N 1/00424; H04N 1/00506
USPC ....................................... 358/1.15
See application file for complete search history.

(56) References Cited

U.S. PATENT DOCUMENTS

2006/0190496 A1 8/2006 Tsunoda
2008/0114903 A1* 5/2008 Tadokoro ............... G06F 21/33
710/8

FOREIGN PATENT DOCUMENTS

JP 2006-229869 A 8/2006

* cited by examiner

*Primary Examiner* — Mark R Milia
(74) *Attorney, Agent, or Firm* — Oliff PLC (57) ABSTRACT

An information processing apparatus includes a receiving unit that receives change of registration information that is made after an operator's operation is performed on an application; and a returning unit that returns a state of at least part of the application to a state before the operator's operation in a case where the receiving unit receives the change of the registration information.

14 Claims, 6 Drawing Sheets

OPERATION FOR RETURNING TO MENU ONCE

RETURN TO MENU AND THEN TO FACSIMILE

OPERATION FOR RETURNING TO MENU ONCE

PERFORM OPERATION FOR CHANGING FACSIMILE NUMBER

FIG. 5G

RETURN TO MENU AND THEN TO FACSIMILE

INFORMATION PROCESSING APPARATUS

CROSS-REFERENCE TO RELATED APPLICATIONS

This application is based on and claims priority under 35 USC 119 from Japanese Patent Application No. 2016-210672 filed Oct. 27, 2016.

BACKGROUND

Technical Field

The present invention relates to an information processing apparatus.

SUMMARY

According to an aspect of the invention, there is provided an information processing apparatus including a receiving unit that receives change of registration information that is made after an operator's operation is performed on an application; and a returning unit that returns a state of at least part of the application to a state before the operator's operation in a case where the receiving unit receives the change of the registration information.

BRIEF DESCRIPTION OF THE DRAWINGS

An exemplary embodiment of the present invention will be described in detail based on the following figures, wherein.

DETAILED DESCRIPTION

An exemplary embodiment of the present invention is described in detail below with reference to the accompanying drawings.

Figure 1:
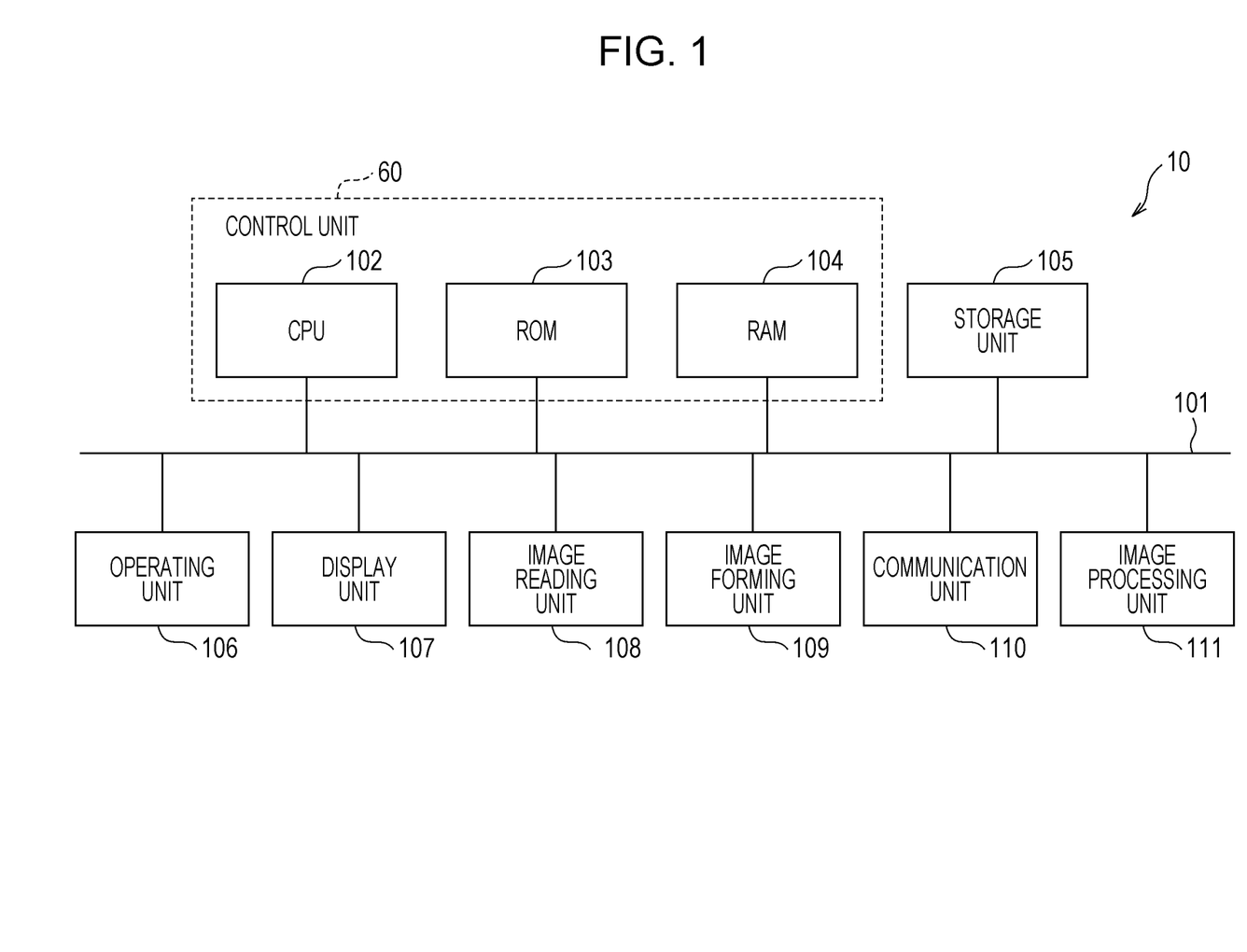
FIG. 1 illustrates an image forming apparatus according to the present exemplary embodiment.

FIG. 1 illustrates an image forming apparatus 10 according to the present exemplary embodiment.

As illustrated in FIG. 1, functional units that constitute the image forming apparatus 10 according to the present exemplary embodiment are connected to a bus 101 and exchange data over the bus 101.

An operating unit 106 is realized, for example, by a touch panel that outputs a control signal according to a pressed position. In the present exemplary embodiment, the operating unit 106 is provided so as to overlap a display unit 107 (described later). When an operator operates the display unit 107, information is input to the image forming apparatus 10.

The display unit 107 is realized, for example, by a liquid crystal display and displays data concerning the image forming apparatus 10 under control of a CPU 102. Furthermore, the display unit 107 displays a menu screen that is referred to when an operator (user) operates the image forming apparatus 10.

An image reading unit 108 is realized by a scanner device, and reads an image on a placed document and generates a read image (image data) of the document.

An image forming unit 109 that is an example of an image forming unit forms a toner image according to image data on a sheet of paper that is a recording medium, for example, by an electrophotographic system. The image forming unit 109 may form an image by another system such as an inkjet head system.

A communication unit 110 is connected to a communication line (not illustrated) and functions as a communication interface that communicates with other apparatuses connected to the communication line.

An image processing unit 111 performs image processing such as color correction and gradation correction on an image expressed by image data.

A storage unit 105 is realized by a storage device such as a hard disc device and stores therein, for example, data received by the communication unit 110 and read image (image data) generated by the image reading unit 108. Furthermore, the storage unit 105 stores therein application programs corresponding to respective applications that will be described later.

A control unit 60 controls each unit of the image forming apparatus 10. The control unit 60 includes a central processing unit (CPU) 102, a read only memory (ROM) 103, and a random access memory (RAM) 104.

The ROM 103 stores therein a program executed by the CPU 102. The CPU 102 reads out the program stored in the ROM 103 and executes the program by using the RAM 104 as a working area.

When the CPU 102 executes a program, the CPU 102 controls each unit of the image forming apparatus 10, and thus the image forming apparatus 10, for example, forms an image on a sheet of paper or generates a read image of a document by reading the document.

Figure 2:
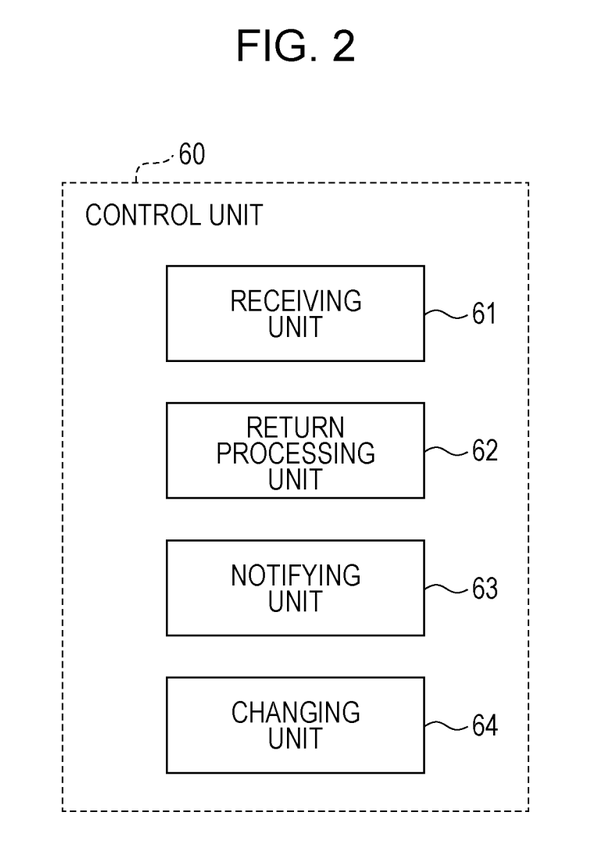
FIG. 2 is a block diagram illustrating a functional configuration of a control unit.

In the present exemplary embodiment, when the CPU 102 executes a program, the control unit 60 functions as a receiving unit 61, a return processing unit 62, a notifying unit 63, and a changing unit 64 as illustrated in FIG. 2 (a block diagram illustrating a functional configuration of the control unit 60). In FIG. 2, only functional blocks concerning applications (described later) are displayed.

The receiving unit 61 receives change of registration information (an operator's operation for changing registration information) registered (stored) in the storage unit 105, the ROM 103, or the like via the operating unit 106 (see FIG. 1).

The return processing unit 62 resets an application and returns a state of at least part of the application to a state before an operator's operation.

The notifying unit 63 gives a predetermined notification to an operator, for example, by displaying predetermined information on the display unit 107 or by outputting sound through a speaker (not illustrated).

The changing unit 64 changes registration information registered in the storage unit 105, the ROM 103, or the like in accordance with an operator's changing operation received by the receiving unit 61. In other words, the changing unit 64 edits the registration information.

The receiving unit 61, the return processing unit 62, the notifying unit 63, and the changing unit 64 are realized by cooperation of software and hardware resources.

Specifically, in the present exemplary embodiment, a program is stored in the ROM 103 (see FIG. 1) and the storage unit 105. In the present exemplary embodiment, the CPU 102 loads this program from the ROM 103 or the like into the RAM 104 that is a first memory and executes the program, and thus the functional units, i.e., the receiving unit 61, the return processing unit 62, the notifying unit 63, and the changing unit 64 are realized.

The program to be executed by the CPU 102 may be offered to the image forming apparatus 10 in a state where the program is stored in a computer-readable recording medium such as a magnetic recording medium (e.g., a magnetic tape, a magnetic disc), an optical recording medium (e.g., an optical disc), a magneto optical recording medium, or a semiconductor memory.

The program to be executed by the CPU 102 may be downloaded into the image forming apparatus 10 by using a means of communication such as the Internet.

In the present exemplary embodiment, a portion where the receiving unit 61, the return processing unit 62, the notifying unit 63, and the changing unit 64 are provided may be regarded as an information processing apparatus that performs processing concerning an application.

FIGS. 3A through 3H illustrate a flow of processing according to the present exemplary embodiment.

Figure 3A:
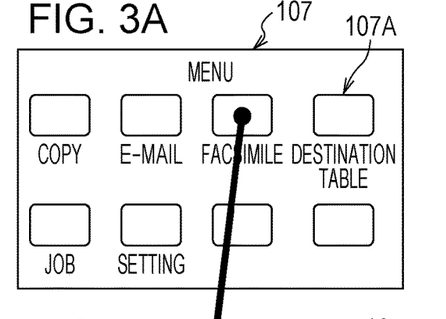
FIGS. 3A through 3H illustrate a flow of processing according to the present exemplary embodiment.

In the present exemplary embodiment, a menu screen is displayed on the display unit 107 as illustrated in FIG. 3A. More specifically, plural icons (selecting buttons) 107A for selecting applications (application programs) are displayed on the display unit 107.

An operator selects any icon 107A from among the plural icons 107A and thus selects a desired application.

The following describes an example in which an operator selects a "facsimile" application (hereinafter referred to as a "facsimile application") as illustrated in FIG. 3A.

Figure 3B:
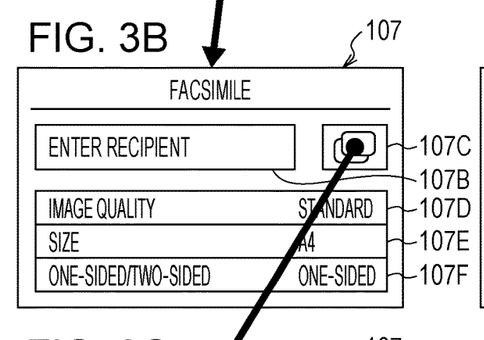

When the facsimile application is selected and activated, the menu screen switches to a display screen illustrated in FIG. 3B. On this display screen, an entry box 107B for entry of a recipient and a list display button 107C for displaying a list of registered recipients are displayed.

On a lower part of the display screen, an image quality changing button 107D for changing an image quality, a size changing button 107E for changing a size, and a selecting button 107F for selecting one-sided or two-sided are displayed.

Figure 3C:
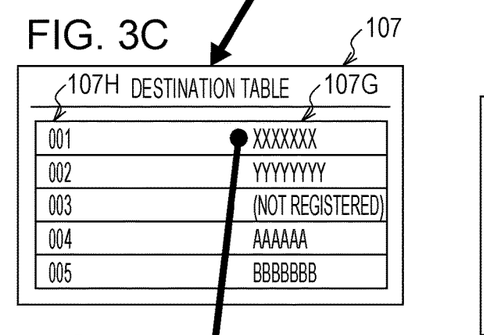

When the list display button 107C is selected, the screen switches to a display screen illustrated in FIG. 3C. On the display screen illustrated in FIG. 3C, plural recipients 107G and abbreviated numbers 107H for identifying the respective plural recipients 107G are displayed.

Figure 3D:
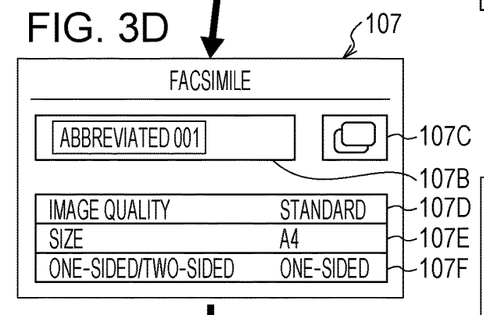

Then, in this example, the operator selects an abbreviated number "001". As a result the abbreviated number "001" is entered in the entry box 107B, and thus a facsimile recipient is set, as illustrated in FIG. 3D.

Figure 3E:
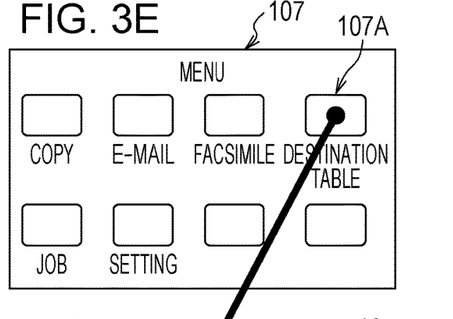

Then, in this example, a "return button" (not illustrated) is pressed before a "transmission button" (not illustrated) is pressed by the operator. As a result, the menu screen is displayed again as illustrated in FIG. 3E.

In the present exemplary embodiment, the aforementioned setting concerning a recipient of information (the setting using the abbreviated number "001") in the facsimile application is maintained even after the operation for returning to the menu screen.

Figure 3F:
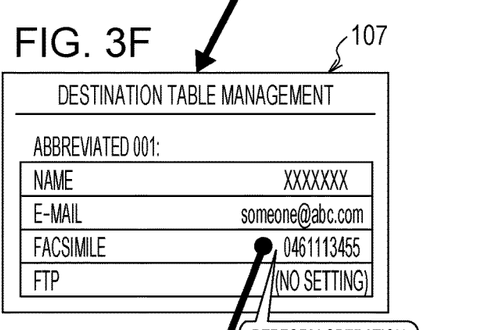

In this example, after the menu screen illustrated in FIG. 3E is displayed again, an application given a name "DESTINATION TABLE" (hereinafter referred to as an "destination table management application") is activated, and thus a display screen illustrated in FIG. 3F is displayed.

The destination table management application is an example of a receiving application and is an application for receiving an operation for changing registration information such as a facsimile number.

On the display screen illustrated in FIG. 3F, an abbreviated number, a name, an e-mail address, a facsimile number, and the like are displayed.

More specifically, in the image forming apparatus 10 according to the present exemplary embodiment, one or more combinations of pieces of information such as abbreviated number, name, e-mail address, and facsimile number are registered in advance, and these pieces of information are displayed when the destination table management application is activated.

On the display screen illustrated in FIG. 3F, the operator is allowed to change registration information such as a name, an e-mail address, and a facsimile number.

Specifically, when the operator selects a portion where registration information such as a name, an e-mail address, or a facsimile number is displayed by pressing the portion, a keyboard (not illustrated) for entry of information is displayed on the display screen. The operator changes the registration information by operating the keyboard.

In the present exemplary embodiment, an example in which a destination is edited (FIG. 3F) after the menu screen is displayed again (FIG. 3E) has been described. However, another example in which a destination is edited without displaying the menu screen again is also possible.

Specifically, for example, a destination may be editable on the display screen illustrated in FIG. 3C. More specifically, for example, it is also possible to employ an arrangement in which when the operator presses the list display button 107 again on the display screen illustrated in FIG. 3D, the destination table illustrated in FIG. 3C is displayed, and the operator is allowed to edit a destination by operating the destination table.

Figure 3G:
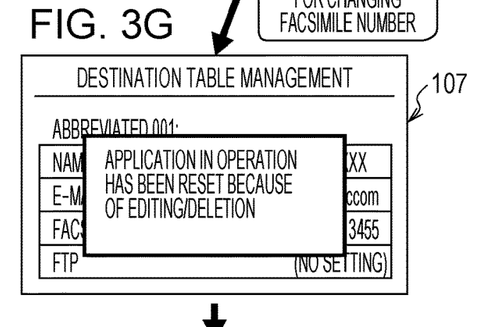

For example, in a case where a facsimile number is changed by the operator, information indicating that the application that is being activated has been reset is displayed on the display screen as illustrated in FIG. 3G.

Specifically, in the present exemplary embodiment, when a facsimile number is changed by the operator (when registration information is changed), the application that is being activated is reset (initialized). Specifically, in the present exemplary embodiment, the facsimile application is being activated, and therefore the facsimile application is reset.

After the application is reset, information indicating that the application has been reset is displayed as illustrated in FIG. 3G.

Then, in this example, the "return button" (not illustrated) is operated again by the operator, and thus the menu screen is displayed again. Then, the icon 107A of the facsimile application is selected again. As a result, the facsimile application is displayed again as illustrated in FIG. 3H.

In the present exemplary embodiment, an application that is being activated is reset (initialized) in a case where registration information is changed, as described above.

Figure 3H:
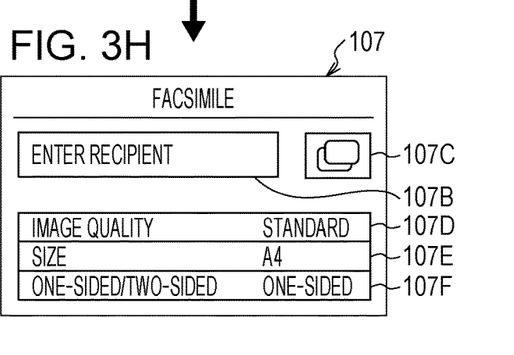

As a result, in the present exemplary embodiment, the entry box 107B is made blank as illustrated in FIG. 3H. In other words, in the present exemplary embodiment, the state of the facsimile application returns to a state before the operator's operation, i.e., returns to a state where a recipient of information has not been set.

More specifically, in the present exemplary embodiment, the abbreviated number "001" is entered in the entry box 107B and thus a recipient of information is set as illustrated in FIG. 3D, but in a case where registration information is changed, information about the abbreviated number "001" is deleted from the entry box 107B, and thus the state returns to a state where a recipient has not been set.

The "state before the operator's operation" is a state before (previous to) a time (reference time) of an operator's operation of editing (changing or deleting) registration information (operation of determining edited contents) and before an editing operation performed before this reference time.

It may be assumed that the operator performs an editing operation including plural steps (plural editing operations) before the reference time, the "state before the operator's operation" may be, for example, a state before a last editing operation (a last one of the plural editing operations) (a state immediately before the last editing operation) or may be a state before all of the editing operations.

In the present exemplary embodiment, an image quality, a size, one-sided/two-sided, and the like can be set by operating the image quality changing button 107D (see FIG. 3B), the size changing button 107E, and the selecting button 107F. In the present exemplary embodiment, these settings are not reset and are maintained even after a facsimile number is changed.

This is because settings concerning an image quality, a size, one-sided/two-sided, and the like are not related to a recipient of information, and erroneous transmission (described later) does not occur even in a case where these pieces of information are not reset.

Even in a case where registration information is changed in the destination table management application, the setting concerning a recipient may be maintained as long as the changed registration information is registration information other than information for specifying the recipient.

Specifically, the setting concerning a recipient is reset in a case where registration information such as a name, an e-mail address, or a facsimile number illustrated in FIG. 3F is changed, but the setting concerning a recipient may be maintained in a case where registration information other than these pieces of information is changed.

Recently, a system in which a setting in one application is maintained in a case where another application is activated after the setting is made in the one application is increasingly employed.

According to such a system, in a case where a setting is changed in the other application, this change of the setting may affect the one application, thereby undesirably resulting in that processing different from intended processing is performed in the one application.

Specifically, for example, in a case where the one application is the facsimile application, there is a risk of transmission of a facsimile to a wrong recipient.

Furthermore, for example, according to the system in which a setting made in the facsimile application is maintained, it is unclear whether a facsimile is to be transmitted to a destination before editing or a destination after editing in a case where a name, an e-mail address, a facsimile number, or the like is changed. This also may result in a risk of transmission of a facsimile to a wrong recipient.

Meanwhile, in a case where the facsimile application is reset as in the present exemplary embodiment, an operator needs to newly set a recipient. As a result, erroneous transmission of a facsimile is less likely to occur.

Figure 4:
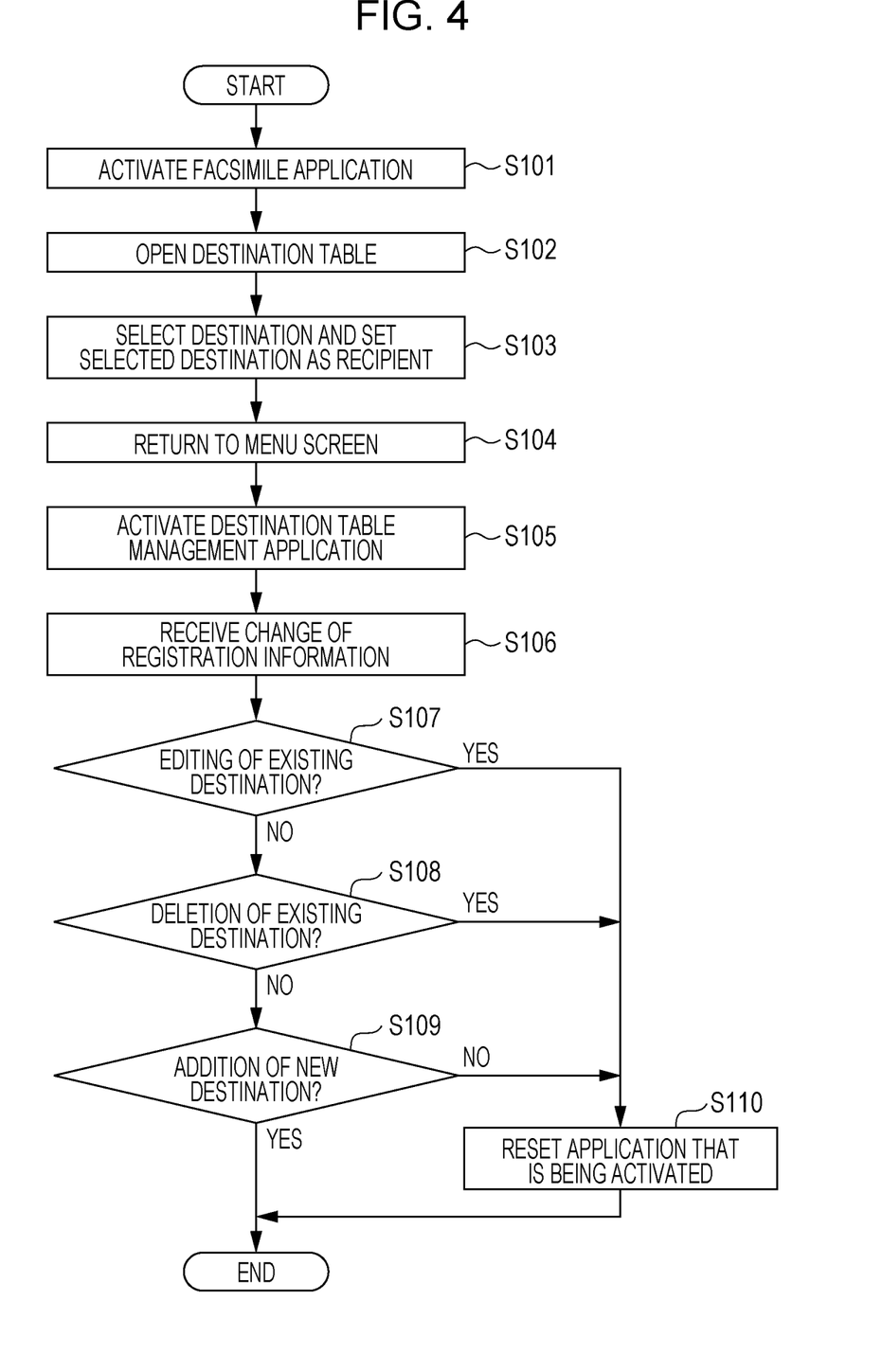
FIG. 4 is a flowchart illustrating a flow of the processing illustrated in FIGS. 3A through 3H.

FIG. 4 is a flowchart illustrating a flow of the processing illustrated in FIGS. 3A through 3H.

In the present exemplary embodiment, first, an operator selects an icon 107A from among plural icons 107A displayed on the menu screen, and an application corresponding to the selected icon 107A is activated (Step 101). In this processing, it is assumed that the facsimile application is activated.

Then, the operator opens a destination table by operating the facsimile application (Step 102). Specifically, the operator opens the destination table by pressing the list display button 107C illustrated in FIG. 3B.

Then, the operator selects a destination to which the operator wants to transmit a facsimile (select any one of the abbreviated numbers 107H) and thereby sets the destination as a recipient (Step 103).

Then, the operator presses the return button (not illustrated) to return to the menu screen (Step 104).

Next, in this processing, the operator selects an icon 107A corresponding to the destination table management application, and thus the destination table management application is activated (Step 105).

Next, the operator performs an operation for changing registration information concerning a destination, and the receiving unit 61 that is an example of a receiving unit receives the change of the registration information made by the operator (Step 106).

Then, the return processing unit 62 that is an example of a returning unit determines whether or not the change of the registration information made by the operator is editing of an existing destination (Step 107).

In a case where the change of the registration information is editing of an existing destination, the return processing unit 62 resets the facsimile application activated in Step 101 (the facsimile application that is being activated) (Step 110).

Meanwhile, in a case where it is determined in Step 107 that the change of the registration information is not editing of an existing destination, the return processing unit 62 determines whether or not the change of the registration information is deletion of an existing destination (Step 108).

In a case where the change of the registration information is deletion of an existing destination, the return processing unit 62 resets the facsimile application activated in Step 101 as in the above step (Step 110).

Meanwhile, in a case where it is determined in Step 108 that the change of the registration information is not deletion of an existing destination, the return processing unit 62 determines whether or not the change of the registration information is addition of a new destination (addition of registration information) (Step 109). In a case where the change of the registration information is addition of a new destination (in a case where the change of the registration information is change of adding information), the processing is finished without resetting the facsimile application.

In the present exemplary embodiment, in a case where the change of the registration information is addition of a new destination, erroneous transmission of a facsimile does not occur. For this reason, in the present exemplary embodiment, the facsimile application is not reset in a case where the change of the registration information is addition of a new destination.

FIGS. 5A through 5H illustrate another example of processing performed in the image forming apparatus 10.

Figure 5A:
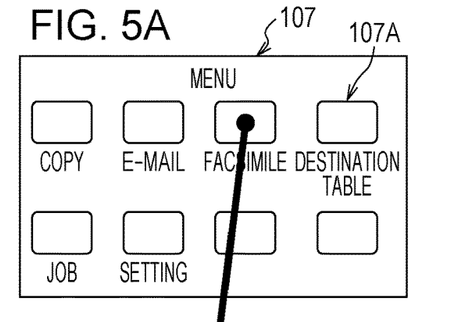
FIGS. 5A through 5H illustrate another example of processing performed in the image forming apparatus.
Figure 5B:
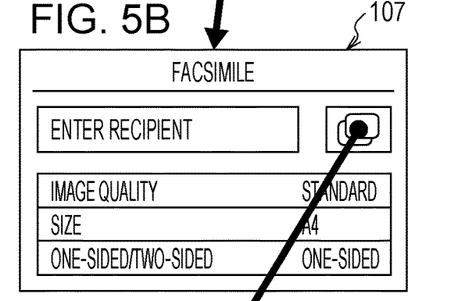
Figure 5C:
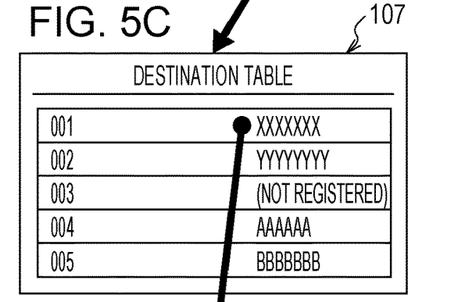
Figure 5D:
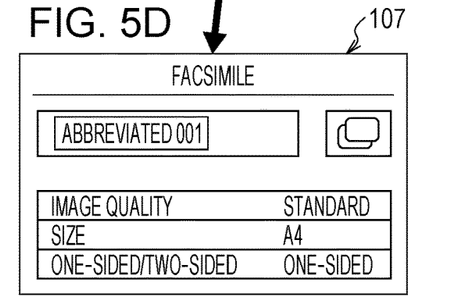
Figure 5E:
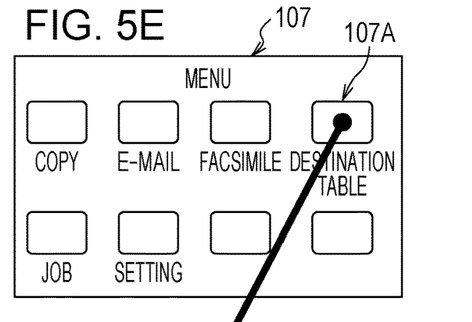
Figure 5F:
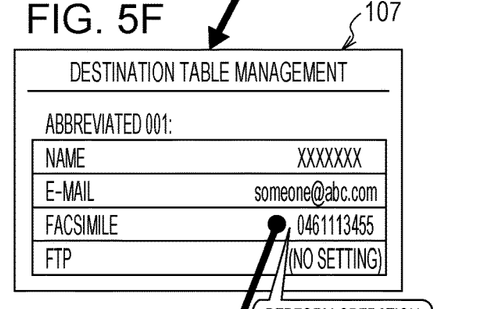
Figure 5G:
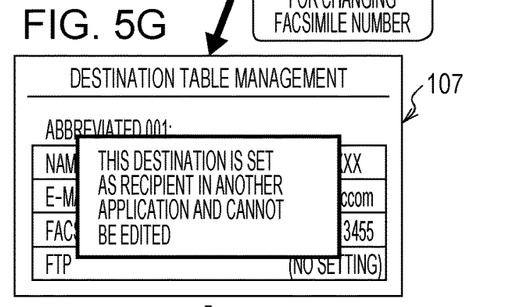
Figure 5H:
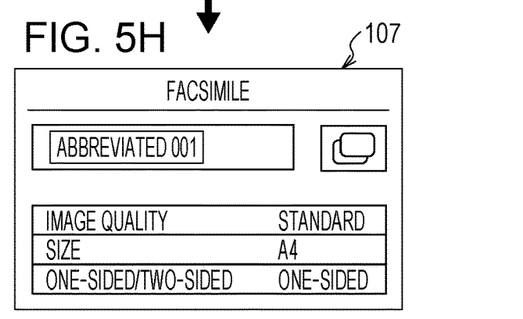

The processes illustrated in FIGS. 5A through 5E are similar to those illustrated in FIGS. 3A through 3E, and processes in FIGS. 5F through 5H are described below.

In this processing illustrated in FIGS. 5A through 5H, a facsimile number is changed in the destination table management application as illustrated in FIG. 5F while the facsimile application and the destination table management application are being activated as in the above processing.

Specifically, an operation for changing a facsimile number (an operator's changing operation) is performed in the destination table management application, and the receiving unit 61 receives this changing operation.

Then, in the present exemplary embodiment, as illustrated in FIG. 5G, the notifying unit 63 gives a predetermined notification to the operator. Specifically, the notifying unit 63 gives a notification indicating that a facsimile number cannot be edited (changed).

More specifically, the notifying unit 63 gives a notification indicating that a facsimile number cannot be edited since the facsimile number which the operator is trying to change is set as a recipient in another application (the facsimile application). In other words, the notifying unit 63 gives a notification indicating that registration information cannot be changed.

In this processing, in a case where registration information which the operator tries to change is related to an application that is being activated, a notification indicating that the registration information cannot be edited (changed) is given to the operator.

In this processing, in a case where registration information which the operator tries to change is related to an application that is being activated, the changing unit 64 does not receive information entered by the changing operation and does not change the registration information. This makes erroneous transmission of information less likely as in the above case.

In this example, in a case where registration information which the operator tries to change is related to an application that is being activated, a notification indicating that the registration information cannot be changed is given to the operator. However, this processing is an example, and different processing may be performed.

Specifically, for example, the process of giving a notification indicating that the registration information cannot be changed and the process of not changing the registration information may be performed irrespective of whether or not the registration information which the operator tries to change is related to an application that is being activated.

More specifically, the process of giving a notification indicating that the registration information cannot be changed and the process of not changing the registration information may be always performed in a case where an operation for changing the registration information is performed while an application different from the destination table management application is being activated.

Figure 6:
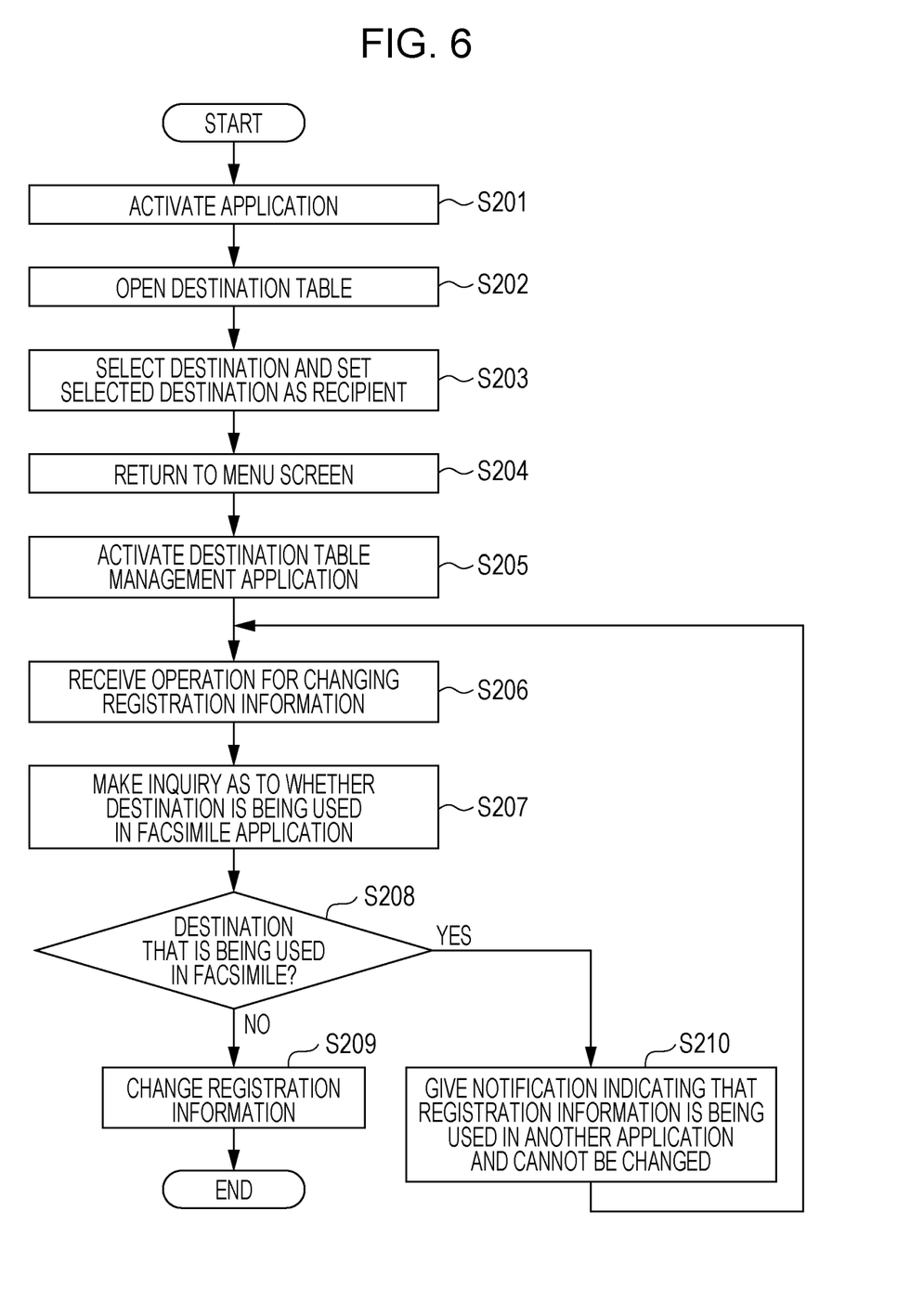
FIG. 6 is a flowchart illustrating a flow of the processing illustrated in FIGS. 5A through 5H.

FIG. 6 is a flowchart illustrating a flow of the processing illustrated in FIGS. 5A through 5H. The processes in Steps 201 through 205 in FIG. 6 are similar to those in Steps 101 through 105 in FIG. 4, and therefore the processes in Step 206 and the subsequent steps in FIG. 6 are described below.

In the process in Step 206 of FIG. 6, the operator performs an operation for changing a destination on the destination table management application, and this changing operation is received by the receiving unit 61.

Next, the notifying unit 63 transmits information concerning the destination received by the receiving unit 61 to the facsimile application and makes an inquiry as to whether or not this destination is used in the facsimile application (Step 207).

Then, the notifying unit 63 receives a response from the facsimile application and determines whether or not the destination is used in the facsimile application on the basis of this response (Step 208).

Then, in a case where it is determined that the destination is used in the facsimile application, the notifying unit 63 gives a notification indicating that the registration information cannot be changed to the operator as described above (Step 210). More specifically, the notifying unit 63 gives a notification indicating that the registration information is used in another application and cannot be changed (edited).

Meanwhile, in a case where it is determined in Step 208 that the destination is not used in the facsimile application, the process in Step 209 is performed. In this process in Step 209, the changing unit 64 that is an example of a changing unit performs an operation for changing the registration information in accordance with the changing operation received by the receiving unit 61.

A case where the facsimile application is reset in a case where a facsimile is transmitted and a destination is edited has been described above as an example. However, this is an example, and resetting of an application may be applied to a case where different processing is performed.

Specifically, for example, there are cases where registration information about a confidential box (a folder for data storage) is changed (e.g., the confidential box is deleted) after the confidential box is designated on a scan application for processing for storing read data in the confidential box.

Also in such cases, the scan application can be reset as in the above case. Alternatively, a notification such as "confidential box cannot be deleted" can be given as in the case of FIG. 5G.

Furthermore, for example, there are cases where after an operator sets a paper size and a paper quality on a print application for copying, printing, and the like, a sheet of paper in a paper container, for example, is changed to a sheet of paper of a different size or a different quality (registration information concerning a paper size and a paper quality is changed). This results in a risk of formation of an image on a sheet of paper having a size different from an intended size or formation of an image on a sheet of paper having a paper quality different from an intended paper quality.

In such cases, by resetting the print application in a case where registration information concerning a sheet of paper is changed, it is possible to make it less likely to form an image on a sheet of paper having a size different from an intended size or form an image on a sheet of paper having a paper quality different from an intended paper quality.

Furthermore, by giving a notification such as "sheet size and type cannot be changed" as in the case illustrated in FIG. 5G in a case where registration information concerning a sheet of paper is changed, it is possible to make it less likely to form an image on a sheet of paper having a size different from an intended size or form an image on a sheet of paper having a paper quality different from an intended paper quality.

There are cases where registration information is changed while plural applications are being activated. In such cases, all of the applications that are being activated may be reset.

In other words, in a case where registration information is changed while plural applications are being activated, states of all of the applications operated by an operator may be returned to ones before the operation.

Alternatively, in a case where plural applications are being activated, only an application related to changed registration information may be reset, and a state of an application that is not related to the changed registration information may be maintained.

In other words, in a case where plural applications are being activated, only an application related to changed registration information may be returned to a state before an operator's operation, and a setting made in an application that is not related to the changed registration information may be maintained.

In this case, the operator need not make a setting again in the application that is not related to the changed registration information.

When an application is reset, only a setting related to changed registration information may be reset, and other settings that are not related to the changed registration information may be maintained without being reset.

This is described below by taking the facsimile application as an example. In a case where registration information concerning a recipient of a facsimile is changed, only a setting concerning a recipient may be reset (returned to a state where no recipient is set), and other settings concerning a size and the like may be maintained without being reset.

In the present exemplary embodiment, a notification indicating that an application has been reset is given to an operator in a case where registration information is changed, as illustrated in FIG. 3G. This notification may be given after all changes of registration information are confirmed.

Specifically, in the present exemplary embodiment, there are plural items to be changed such as a name, an e-mail address, and a facsimile number as illustrated in FIG. 3F. Instead of resetting an application every time each of these items is changed, it is also possible to reset the application and to give a notification that the application has been reset after all changes by an operator are confirmed.

For example, a button such as a "decide button" is prepared in order to determine whether or not all changes by an operator have been confirmed. It is determined that all changes by an operator have been confirmed in a case where this button is pressed by the operator.

Alternatively, an inquiry as to whether to reset an application promptly or later may be given to an operator in a case where registration information is changed.

In a case where an operator's answer to the inquiry indicates that the operator wants to reset the application promptly, the application is reset every time the registration information is changed.

In a case where an operator's answer to the inquiry indicates that the operator wants to reset the application later, the application is reset, for example, when this application to be reset is selected again by the operator and displayed on a display screen.

In a case where an application can be reset later, it is possible to prevent the application from being reset every time registration information is changed. This allows an operator to more easily perform an operation.

In a case where an application is reset every time registration information is changed, the application is reset and information indicating that the application has been reset is displayed every time each item to be changed such as a name, an e-mail address, or a facsimile number is changed.

In such a case, information indicating that the application has been reset is frequently displayed on a display screen. This may undesirably make it hard for an operator to perform an operation for changing registration information.

In a case where an application can be reset later, it is possible to prevent information indicating that the application has been reset from being frequently displayed. This allows an operator to more easily view the display screen and perform an operation.

Furthermore, in a case where a setting is made in one application and this setting is maintained (processing based on the setting has not been started), a notification indicating that the setting is still maintained in this application may be given on the menu screen.

Specifically, for example, a notification indicating that the setting is still maintained (the setting has not been confirmed) may be given by adding a predetermined image (e.g., a small icon showing that the setting has been changed) to an icon 107A corresponding to this application.

In this case, the predetermined image is deleted when registration information is changed and the application is reset.

In a case where such processing is performed, an operator may be more clearly notified of whether or not an application has been reset. Furthermore, the operator may be notified of a possibility that a setting made in the application may be canceled.

Furthermore, a predetermined notification may be given to an operator of the image forming apparatus 10 in a case where an operation for changing registration information is performed outside the image forming apparatus 10.

This notification is given by the notifying unit 63 that is an example of notifying unit. For example, information indicating that an operation for changing registration information is being performed is displayed on the display unit 107, and thus an operator is notified of a possibility that the registration information may be changed.

Registration information may be changed not only by an operator who directly operates the image forming apparatus 10, but also by an administrator or the like who accesses the image forming apparatus 10 over the communication line. In addition, registration information may be changed remotely.

In such a case, a predetermined notification is desirably given to the operator who directly operates the image forming apparatus 10.

Specifically, for example, it is desirable to give a notification indicating that an operation for changing registration information is being performed to the operator who directly operates the image forming apparatus 10. In this way, the operator may be notified of a possibility that the registration information may be changed.

In this case, for example, the operator suspends his or her operation. This makes erroneous transmission of a facsimile or the like less likely as in the above case.

In a case where registration information is remotely changed, an authority to reset an application may be given to the operator of the image forming apparatus 10, and the application may be reset in a case where an instruction from the operator is given, for example, to the image forming apparatus 10 instead of automatically resetting the application.

More specifically, for example, in a case where registration information is changed remotely, an inquiry as to whether or not it is possible to reset an application is given to the operator on the display unit 107, and the application is reset in a case where an answer indicating that the application can be reset is given from the operator. This makes it less likely that the application is reset at a timing that is not intended by the operator.

Furthermore, in a case where registration information is remotely changed, predetermined information may be displayed on the display unit 107 in order to notify an operator about information concerning a parameter that needs to be changed in accordance with the change of the registration information.

As another processing, erroneous transmission of a facsimile or the like may be made less likely by giving a predetermined notification instead of performing resetting processing.

Specifically, in a case where registration information is changed in an application such as the destination table management application, erroneous transmission of information or the like may be made less likely by giving a predetermined notification to an operator in another application (e.g., in the facsimile application) in which a setting is maintained.

More specifically, a notification such as "The destination table has been changed, and there is a possibility of occurrence of erroneous transmission. Check a recipient again." is given on a display screen on which the other application in which the setting is maintained is displayed. This makes erroneous transmission of information less likely.

In a case where this notification is given, the application may be reset at the same time as this notification or only the notification may be given without resetting the application.

Although processing performed in a case where a facsimile is transmitted has been described above mostly, the processing described above is applicable to not only facsimile transmission, but also transmission using another method such as e-mail transmission.

Although processing in the image forming apparatus 10 has been described above, the processing described above is applicable to not only processing in the image forming apparatus 10, but also processing in another apparatus such as a smartphone or a personal computer.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a processor configured to function as:
a first receiving unit of a first application including an entry box having an initial state, the entry box configured to receive an operator's operation selecting a setting having corresponding registration information on the first application, and the operator's operation changing the entry box to a selected state different than the initial state;
a second receiving unit of a second application that receives change of the registration information on the second, application after the operator's operation changing the entry box to the selected state; and
a returning unit that returns a state of the entry box of the first receiving unit to the initial state when the second receiving unit receives the change of the registration information on the second application.

2. The information processing apparatus according to claim 1, wherein
when one or more additional applications are activated, the returning unit returns a state of the entry box of the first receiving unit of the first application to the initial state.

3. The information processing apparatus according to claim 2, wherein
the returning unit maintains a state of any additional application of the one or more additional applications that is not related to the changed registration information.

4. The information processing apparatus according to claim 1, wherein
when one or more additional applications are activated, the returning unit returns the state of the entry box of the first application to the initial state and returns the states of at least part of all of the one or more additional applications operated by the operator to states before the operator's operation.

5. The information processing apparatus according to claim 1, wherein
the returning unit does not return the state of the entry box of the first application to the initial state when the change of the registration information on the second application is an addition of information.

6. The information processing apparatus according to claim 1, wherein
the registration information includes a setting concerning a recipient of information, the initial state comprises a state where the setting concerning the recipient has not been made.

7. The information processing apparatus according to claim 6, wherein
wherein the first receiving unit receives a plurality of additional settings, and the returning unit maintains all of the additional settings that do not concern the recipient of information.

8. The information processing apparatus according to claim 1, wherein the processor is further configured to function as a notifying unit that gives a predetermined notification in a case where an operation for changing the registration information is performed outside the information processing apparatus.

9. The information processing apparatus according to claim 1, wherein when the change of registration information is determined to be a deletion of existing registration information or an editing of existing registration information:
an inquiry as to whether to reset the first application promptly or later is displayed to the operator,
when the operator selects to reset the first application promptly, the returning unit returns a state of the entry box of the first receiving unit to the initial state, and
when the operator selects to reset the first application later, the returning unit does not return returns a state of the entry box of the first receiving unit to the initial state until the first application is selected again by the operator.

10. The information processing apparatus according to claim 1, wherein the returning unit:
determines whether the change of the registration information is a deletion of existing registration information, editing of existing registration information, or addition of new registration information;
returns a state of the entry box to the initial state when the change of registration information is determined to be a deletion of existing registration information or an editing of existing registration information; and does not return a state of the entry box to the initial state when the change of registration information is determined to be addition of new registration information.

11. An information processing apparatus comprising:
a processor configured to function as:
a first receiving unit of a first application including an entry box having an initial state, the entry box configured to receive that receives an operator's operation selecting a setting having corresponding registration information on the first application, and the operator's operation changing the entry box to a selected state different than the initial state;
a second receiving unit of a second application that receives an operation for changing the registration information on the second application, after the operator's operation changing the entry box to the selected state is performed; and
a notifying unit that gives a predetermined notification when the operation for changing the registration information is performed while the first application is being activated, the predetermined notification being a notification to the operator that the entry box has been reset to the initial state because of the change of the registration information on the second application.

12. The information processing apparatus according to claim 11, wherein
the notifying unit gives the predetermined notification when the operation for changing the registration information on the second application is related to the first application and does not give the predetermined notification in a case where the operation for changing the registration information on the second application is not related to the first application.

13. The information processing apparatus according to claim 11, wherein the processor is further configured to function as a changing unit that changes the registration information in accordance with the changing operation received by the second receiving unit, wherein the changing unit does not change the registration information corresponding to the changing operation in a case where the operation for changing the registration information is related to the first application.

14. The information processing apparatus according to claim 11, further comprising a wherein the processor is further configured to function as a returning unit that returns a state of the entry box of the first receiving unit to the initial state when the second receiving unit receives the change of the registration information on the second application.

* * * * *